UNITED STATES PATENT OFFICE.

WALTER K. FREEMAN, OF OSCAWANA, NEW YORK.

PROCESS FOR MAKING CEMENT COMPOUNDS.

1,027,118.  Specification of Letters Patent.  Patented May 21, 1912.

No Drawing.   Application filed February 16, 1911. Serial No. 609,014.

*To all whom it may concern:*

Be it known that I, WALTER K. FREEMAN, a citizen of the United States, and a resident of Oscawana, in the county of Westchester and State of New York, have invented certain new and useful Processes for Making Cement Compounds, of which the following is a specification.

The primary object of this invention is the production of a tough, durable, fire and water proof, germ and vermin proof, non-friable, non-disintegrating composition of matter suitable for floors, ceilings, walls, paving blocks, partitions, electric switchboards, panel-box linings and other electrical appliances, doors, door trimmings and linings, stair treads, table tops, pipe coverings, fire shutters, sinks, wash tubs, pails, tanks, tubs, ice boxes, and many other kinds of compartments, vessels and insulating materials, and for other purposes.

In practice, I utilize sawdust, straw, shavings, and other fibrous vegetable matter, or any of them, reduced to the proper degree of fineness, and sprinkle or spray upon the same a quantity of linseed oil and mix them thoroughly; I then add to the mass so made and mix thoroughly therewith some dry powdered caustic alkali (sodium or potassium hydrate), preferably using a mixing machine. The alkali thus introduced, after a time unites with the oil added and with the resins or other saponifiable matter naturally or initially present in the fiber, to form a soapy substance. Such fibrous vegetable matter, with the saponifiable matter thereof saponified *in situ*, I call initially saponified fibrous vegetable matter. To the mass so made, I may add a metallic oxid and a dry powdered metallic chlorid and mix them thoroughly therewith in the machine, whereby there is produced a dry powder which may be put in bags or barrels and be transported to the place where it is to be used, where, by the addition of sufficient water to form a pasty mass, it is prepared for instant use.

For the metallic oxid I prefer to use calcined magnesite, though I may substitute therefor its equivalent zinc oxid, barium oxid, aluminum oxid, etc., and for the metallic chlorid I prefer to use magnesium chlorid, though I may use zinc chlorid, barium chlorid, aluminum chlorid, etc., and my claims herein are to be read and understood, where they refer to magnesium derivatives, as embracing such equivalents.

Where a fine or superior grade of this compound is desired, I add with the metallic oxid and metallic chlorid some casein and pulverized marble or other hard material, to which coloring matter may be added if color be desired, and grind the whole in a Burr mill to thoroughly disintegrate and to blend all the ingredients together. Or I may use sand, broken glass or other like substances as a filler.

One formula is as follows: To each hundred pounds of fibrous vegetable matter, I use from two to five pounds of linseed oil, which is sprayed or sprinkled upon and is thoroughly mixed with the vegetable matter, and then follow this by the addition of from one-half pound to three pounds of powdered caustic soda or potash, which is thoroughly mixed with the above mass, as by placing the whole in a mixer and mixing them together thoroughly; I then introduce into the mixer eighty pounds of calcined magnesite and forty pounds of dry magnesium chlorid, and the whole is then thoroughly mixed and reduced to a powder, in which form it may be packed in bags and barrels for transportation, so that, at the place where it is to be used, it only requires wetting with the proper amount of water to reduce it to a plastic state for covering walls, floors, etc., or for molding or pressing it into any desired shape or form.

In the higher or superior grade of this compound, where it is desired to produce a surface of fine texture, or to have a blend of color and firm elastic character of the material when finished, a modification of the above formula is followed, to wit: To each one hundred pounds of fibrous vegetable matter, reduced to a fine powder, I use three pounds of raw linseed oil as a moistener and thoroughly mix the same; I then add one pound of powdered hydroxid of potash and mix thoroughly. After the potassium hydroxid is intimately mixed with the mass, there are added one hundred pounds of calcined magnesite, two hundred and fifty pounds of pulverized marble or other hard material, three or more pounds of color (if color is desired), two and a half pounds of casein, and fifty pounds of dry magnesium chlorid. The above ingredients are mixed together and are then ground in a Burr mill or the like to disintegrate thoroughly and to blend intimately all the ingredients together. As thus prepared, the powder or product may be packed in bags and barrels for transportation, colored or blended to suit the fancy, and ready to be formed into surfaces for floors, walls and the like, on being wetted with water in quantity sufficient to form a plastic mass, whereby it may be spread upon a surface, or be molded or pressed into any desired shape or form.

In another modification, I proceed as follows: One hundred pounds of sawdust are taken as a base, and to this I add four pounds of linseed oil, and one pound of caustic soda or potash, which are all thoroughly mixed together. If the sawdust is exceptionally dry, a small amount of water is added thereto before the linseed oil is introduced, the purpose being to have sufficient moisture present to cause saponification when the caustic alkali is added later. Ninety pounds of calcined magnesite are added, and this is thoroughly mixed with the ingredients just named above. To the mass so formed, coloring matter may be added, and almost any proportion up to twenty-five times the quantity of magnesium oxid used, of sand, broken glass or other like substances, and the whole mass is then wetted with a solution of magnesium chlorid of such strength as will add fifty per cent. of the solid chlorid to the amount of calcined magnesite used in the mixture. In this instance, of course, the sand, broken glass or other inert material is not reckoned as a part of the compound.

While linseed oil has been referred to above as the proper substance for creating the soapy element in combination with the fibrous vegetable matter that is designed to give elastic character to the final compound, any other oil or grease (oleaginous substance) may be substituted for the linseed oil. In fact, others have been tried, but none give better results than the linseed oil.

The purpose of mixing an oleaginous substance or compound (as linseed oil) with the sawdust or other fibrous vegetable matter, and then adding the hydroxid of potash or soda is to assist in the saponification of the fatty acids and resinous substances that may be contained in the wood or other vegetable matter, and so to soften the fiber in order that it may the more intimately unite with the other substances, and prevent the formation in the mass of the voids or cells in which carbonic acid gas, certain to be formed in the chemical reactions that take place during the setting or hardening of the compound, would be confined when the plastic mass is applied to floors, walls or the like, or is molded or pressed into shape.

There is always some unburned carbonate present with magnesium oxid, and magnesium chlorid usually contains a little acid; the reaction between such acid and the carbonate will produce the gas, which probably explains the origin of the carbonic acid gas referred to above.

Oils are more saponifiable than the resins of vegetable matter, and linseed oil is especially susceptible to saponification. In saponifying the comminuted vegetable matter according to this process, the air is excluded by the semi-gelatinization of the fibers, thus closing the pores of the natural fibers of the comminuted vegetable matter in the saponification of its saponifiable elements. Sodium hydrate, for instance, when used upon the unoiled fibers, hardens them, and stays on the surface thereof, but when the oil is added first and then the hydrate, the oil penetrates the fibers and thus enables the hydrate to penetrate also.

The function of the casein in the finer grade compound is to neutralize calcium oxid, which is usually present in magnesite; this it does by dissolving the minute particles of lime and converting them, in the presence of water, into a viscous compound which no longer possesses the property of lime.

What I claim as new and desire to secure by Letters Patent of the United States is—

1. A magnesia-cement composition containing saponified fibrous vegetable matter.

2. A magnesia-cement composition containing lime and saponified fibrous vegetable matter, casein, and pulverized stony material.

3. A magnesia-cement composition containing fibrous vegetable matter reacted upon by an oleaginous compound and caustic alkali.

4. A cement composition containing commercial magnesium oxid, magnesium chlorid, casein, pulverized stony material, and saponified fibrous vegetable matter.

5. A cement composition containing commercial magnesium oxid, magnesium chlorid, casein, pulverized stony material, and fibrous vegetable matter reacted upon by an oleaginous compound and caustic alkali.

6. A dry powder comprising initially saponified fibrous vegetable matter, linseed oil, saponified with caustic alkali, commercial magnesium oxid, magnesium chlorid in dry form, casein, and pulverized stony material.

7. The process for the manufacture of a cement in dry form, consisting in mixing fibrous vegetable matter with an oleaginous compound, then adding dry caustic alkali to the mass so formed and incorporating the alkali in the mass intimately, thereafter adding to the mass so formed magnesium oxid and dry magnesium chlorid and incorporating them in said mass and reducing the whole to powder, whereby there is formed a dry powder suitable, by the addition of water thereto, for use in forming a plastic compound.

8. The process for the manufacture of a dry cement, consisting in mixing fibrous vegetable matter with an oleaginous compound, then adding dry caustic alkali thereto and mixing the same therewith, then adding magnesium oxid, dry magnesium chlorid, casein, and pulverized stone, and reducing the whole to powder, whereby there is formed a dry powder suitable, by the addition of water thereto, for use in forming a plastic compound.

Signed at New York city in the county of New York and State of New York this 16th day of January A. D. 1911.

WALTER K. FREEMAN.

Witnesses:
ROBT. H. HIBBARD,
R. W. BARKLEY.